Jan. 2, 1923.
R. L. DRAKE.
METHOD FOR ASSEMBLING AND SOLDERING HANDLES.
FILED JAN. 3, 1920.
1,440,865
2 SHEETS-SHEET 1
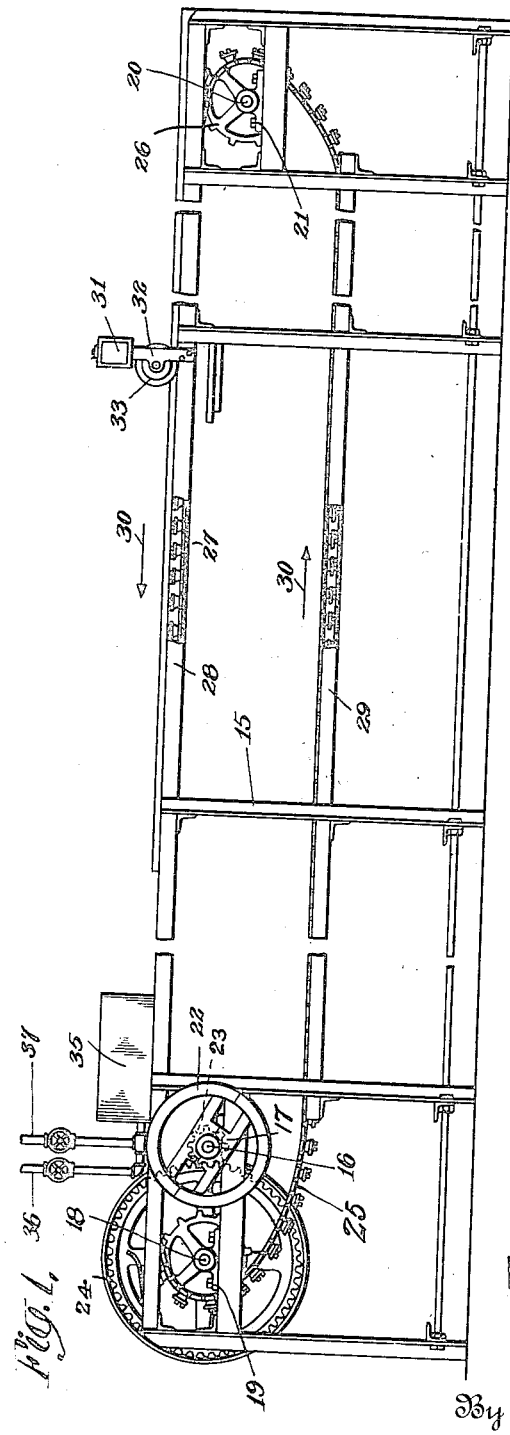
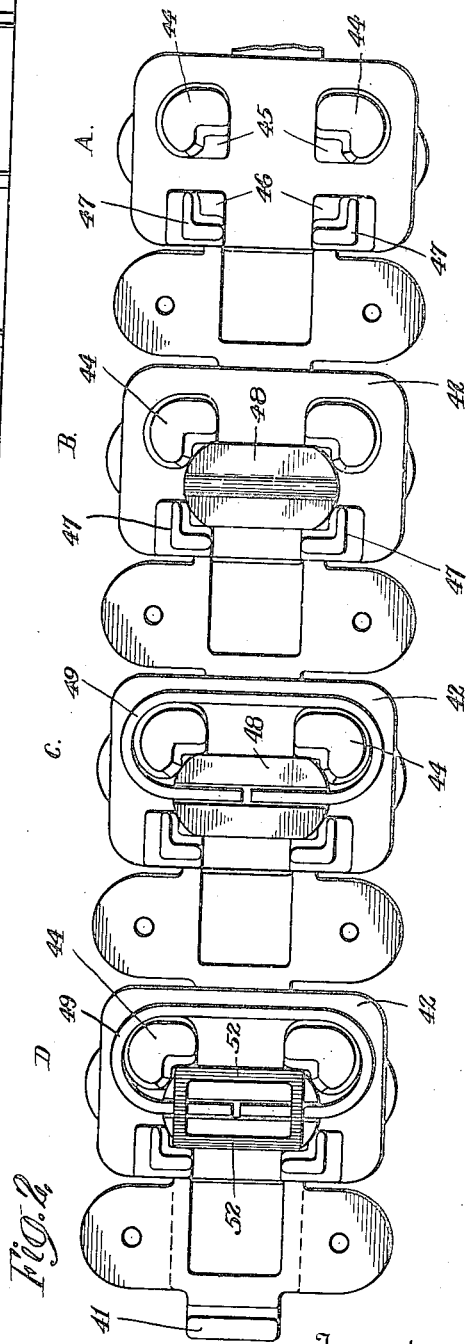
Inventor
Rollin L. Drake
By his Attorney

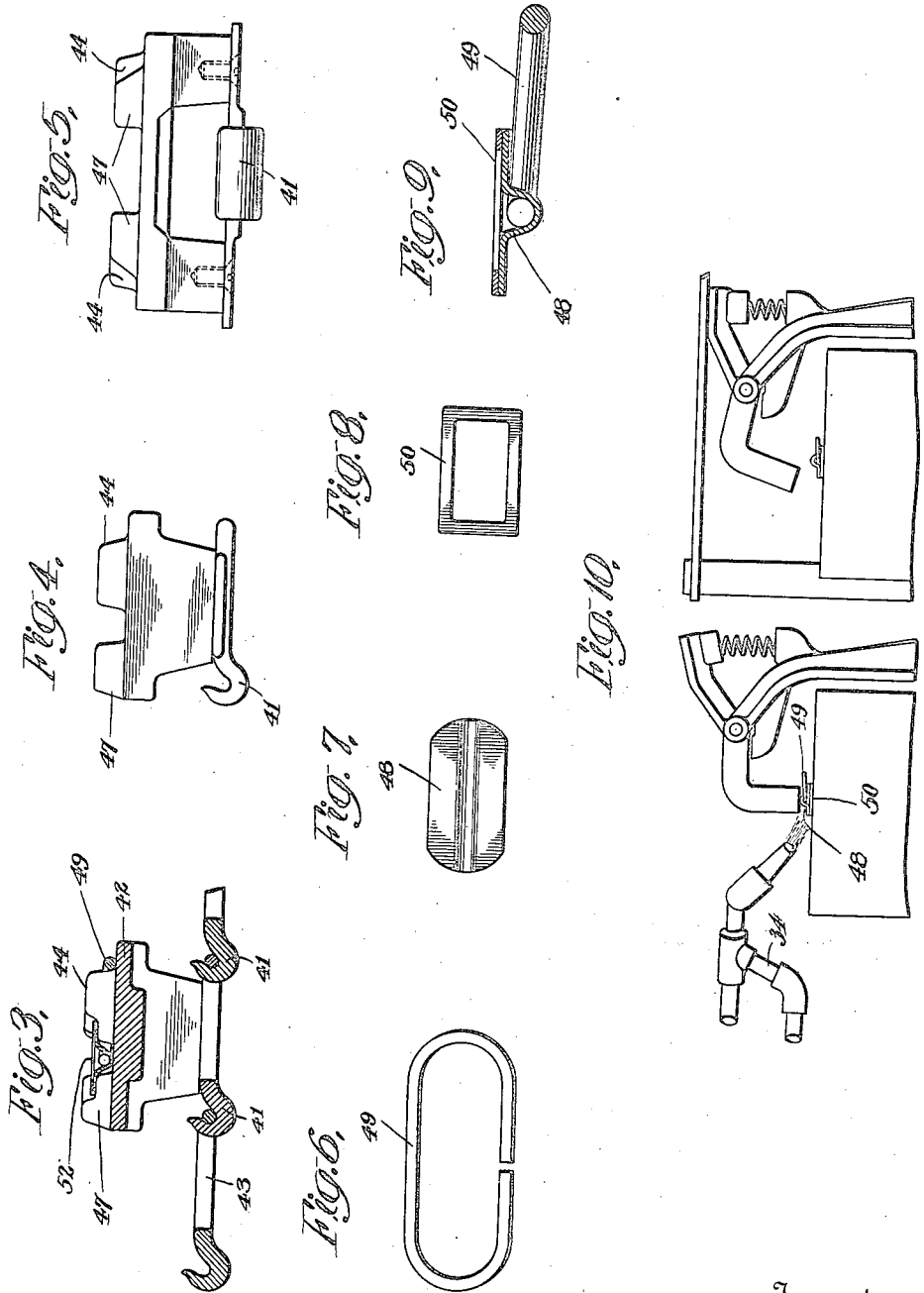

Patented Jan. 2, 1923.

1,440,865

UNITED STATES PATENT OFFICE.

ROLLIN L. DRAKE, OF PORT ARTHUR, TEXAS, ASSIGNOR TO THE TEXAS COMPANY, OF NEW YORK, N. Y., A CORPORATION OF TEXAS.

METHOD FOR ASSEMBLING AND SOLDERING HANDLES.

Application filed January 3, 1920. Serial No. 349,203.

*To all whom it may concern:*

Be it known that I, ROLLIN L. DRAKE, a citizen of the United States of America, and a resident of Port Arthur, in the county of Jefferson and State of Texas, have invented certain new and useful Improvements in a Method for Assembling and Soldering Handles, of which the following is a specification, reference being had to the accompanying drawings, forming a part thereof.

My invention relates to the manufacture of sheet metal cans or containers and it has for its object to provide a simple and improved method of assembling and soldering wire loop handles or the like to sheet metal cans or containers which may, for example be adapted for dispensing oils.

In my copending applications Serial Nos. 349,201 and 349,202 filed of even date herewith I have shown and described machines which are suitable for assembling handle parts and for soldering the handle to the can. My present invention pertains to a method which I prefer to carry out by means of the aforesaid machines, but which may be practiced by any suitable means, so that my invention is by no means limited to any particular form of apparatus.

Other objects and advantages of my invention will be set forth hereinafter and I will now describe the same with reference to the drawings and point out the novel features thereof in the appended claims:

Referring to the drawings:

Figure 1 is a side elevation of a machine which is adapted for carrying out a portion of my improved method.

Figure 2 shows in detail a series of links or chains which forms a part of the machine of Figure 1.

Figure 3 is a sectional view of one of the links of the chain, and;

Figures 4 and 5 are elevations of the same part taken at right angles to each other.

Figure 6 shows a wire handle loop.

Figure 7 shows a clip.

Figure 8 shows a solder blank.

Figure 9 shows the parts of Figures 6, 7 and 8 assembled.

Figure 10 shows the final step of applying the assembled handle parts to the can.

The machine shown in Figure 1 comprises a frame 15, a driving shaft 16, mounted in bearing blocks 17 thereon, a shaft 18 similarly mounted in bearing blocks 19, and a shaft 20, near the opposite end of the machine mounted in bearing blocks 21.

Affixed to the shaft 16 is a drive pulley 22 and a pinion 23 which meshes with a gear wheel 24 on the shaft 18. A chain sprocket 25 is also affixed to the shaft 18 and co-operates with a sprocket wheel 26, mounted on a shaft 20 at the opposite end of the machine, in supporting an endless chain or belt 27. The upper or tight section of the belt or chain is further supported by a track or channel 28 on the frame 15 and the lower loose portion of the chain slides on a carrier or track 29 which is also mounted on the frame. The chain moves, when the shaft 16 is suitably driven, in the direction of the arrows 30, the upper portion moving to the left and the lower part to the right in Figure 1.

A solder flux reservoir 31 is mounted on a suitable bracket or support 32 and is arranged to discharge onto a brush or wiper wheel 33 which engages the endless chain or belt and the handle parts mounted thereon as hereinafter explained.

A gas burner is mounted within a housing 35 near the discharge end of the machine and is supplied with gas and air through pipes 36 and 37. Shelves or shallow pans may be mounted on the frame adjacent to the belt.

The endless chain is composed of a plurality of links which are detachably connected by open hinge joints 41. Alternate links are provided with supporting blocks 42, the others having holes or openings 43 to cooperate with the teeth of the sprocket wheels.

Each of the blocks 42 has a pair of lugs 44 which are adapted to receive a handle loop 49 and which are provided with notches 45 to cooperate with notches 46 of another pair of lugs 47 in providing a support or holder for a handle clip 48 as shown in Figure 3. The arrangement of parts is such that one of the clips 48 may first be mounted in the supporting block as shown at B in Figure 2, the handle loop 49 being then placed in position as shown at C. Finally a solder blank 50 which is of rectangular shape as shown in Figure 8 is mounted on the clip and extends across one side of the handle loop as shown at D in Figure 2.

In operating the machine the pulley 22 is driven so as to produce a continuous movement of the belt as indicated by the arrows 30. An attendant stands by each of three pans (not shown) which are filled respectively with the clips 48, the handle loops 49 and the solder blanks 50. The direction of motion of the belt is such that the supporting blocks 42 come opposite the pans in succession. The attendant opposite the first pan places a clip in the supporting block as shown at B. When the supporting block comes opposite the second pan the attendant there stationed places the handle loop 49 in position as shown at C. Finally, when the block comes opposite the third pan the attendant there stationed places a solder blank in position as shown at D. The sides of the lugs 44 and 47 are inclined so that it is easy to place the parts in the desired position as shown in Figures 3, 4 and 5. This process is continuous and the assembled handle and clip are brought into engagement with the flux wheel 33, which is rotated by its engagement therewith, before the solder blank is placed in position.

Finally, the assembled parts pass into the housing 35 and the gas flame from the burner contained therein is so directed as to soften the solder blank at two opposite points designated 52 in Figure 2. This seals the solder blank to the clip and holds the parts together and the handle in position. The assembled handles then drop off of the belt as the motion continues, a bin being preferably located underneath in position to receive them.

The handles are then ready to be soldered to the sheet metal can or receptacle as shown in Figure 10. This can very readily be accomplished by mounting the handle 49 in position on the can with the solder blank 50 in contact with a clean surface thereof. Heat is then applied from the gas burner 34 to soften the solder blank and seal the parts together, the clip 48 being pressed into position.

The steps of the method are thus apparent and may be outlined as follows:

First a handle clip is mounted in an inverted position on a suitable support. The handle is then mounted on the support in suitable relation to the clip, the solder blank is mounted on the clip and is heated locally to seal it to the clip on the opposite sides of the handle. The assembled handle, clip and solder blank are then mounted in position on the can and heat applied to soften the solder blank while pressure is applied to the clip.

What I claim is:

1. The method of assembling and attaching the handle to a can that consists in supporting the clip having a handle member extending therethrough and fastening a solder blank to the clip across the handle member by applying heat locally to the solder blank, mounting the assembled handle clip and solder blank on the can and applying heat to melt the solder blank so as to cause the clip to adhere to the can.

2. The method of assembling and attaching the handle to a can that consists in supporting the clip having a handle loop extending therethrough and fastening a hollow solder blank to the clip across the handle by applying heat locally to the solder blank at opposite sides of the handle, mounting the assembled handle clip and solder blank on the can and applying heat to melt the solder blank so as to cause the clip to adhere to the can.

3. The method of assembling and attaching the handle to a can that consists in supporting the clip having a handle loop extending therethrough and fastening a hollow solder blank to the clip across the handle by applying heat locally to the solder blank at opposite sides of the handle, mounting the assembled handle clip and solder blank on the surface of the can and applying heat to melt the solder blank and pressure to hold the clip firmly in place while the solder is allowed to set.

In witness whereof, I have hereunto set my hand, this 17th day of December, 1919.

ROLLIN L. DRAKE.